(12) United States Patent
Keeney

(10) Patent No.: US 8,219,462 B1
(45) Date of Patent: Jul. 10, 2012

(54) WINDOW PETAL VALANCE AND METHOD FOR CREATION OF CUSTOMIZED EMBODIMENTS THEREOF

(76) Inventor: Muna Keeney, Lutz, FL (US)

( * ) Notice: Subject to any disclaimer, the term of this patent is extended or adjusted under 35 U.S.C. 154(b) by 76 days.

(21) Appl. No.: 12/719,805

(22) Filed: Mar. 8, 2010

Related U.S. Application Data

(60) Provisional application No. 61/160,547, filed on Mar. 16, 2009.

(51) Int. Cl.
*G06Q 30/00* (2012.01)
(52) U.S. Cl. ............. 705/26.5; 705/26.1; 705/27.1; 705/26.63; 705/27.2
(58) Field of Classification Search ............. 705/26, 705/27, 26.1, 26.5, 26.63, 27.1, 27.2
See application file for complete search history.

(56) References Cited

U.S. PATENT DOCUMENTS

| | | | | |
|---|---|---|---|---|
| 6,572,377 | B2 * | 6/2003 | Masters ............. | 434/72 |
| 7,210,587 | B1 * | 5/2007 | Singer et al. ......... | 211/55 |
| 7,277,572 | B2 * | 10/2007 | MacInnes et al. ..... | 382/154 |
| 7,661,959 | B2 * | 2/2010 | Green et al. ......... | 434/75 |
| 7,912,743 | B2 * | 3/2011 | Kollman ............ | 705/7.11 |
| 2002/0093538 | A1 * | 7/2002 | Carlin .............. | 345/778 |
| 2002/0169675 | A1 * | 11/2002 | Helot et al. .......... | 705/26 |
| 2003/0120618 | A1 * | 6/2003 | Atil et al. ........... | 705/500 |
| 2005/0144090 | A1 * | 6/2005 | Gadamsetty et al. .... | 705/26 |
| 2006/0101742 | A1 * | 5/2006 | Scott-Leikach et al. .. | 52/235 |
| 2007/0244771 | A1 * | 10/2007 | Manley ............. | 705/27 |
| 2008/0125892 | A1 * | 5/2008 | Hoguet ............. | 700/98 |
| 2010/0161288 | A1 * | 6/2010 | Thomas ............. | 703/1 |

OTHER PUBLICATIONS

"Web sites and in-store Internet kiosks allow retail customers to have it their way" (Anonymous. DSN Retailing Today. New York: Jan. 10, 2005. vol. 44, Iss 1; p. 16, 2pgs. Retrieved May 1, 2012 from Proquest).*

* cited by examiner

*Primary Examiner* — Jeffrey A Smith
*Assistant Examiner* — Courtney Stopp
(74) *Attorney, Agent, or Firm* — Gulf Coast Intellectual Property Group

(57) ABSTRACT

A system and method for designing a plurality of customized embodiments of petal window valances utilizing an on-line design interface. The system includes an on-line design server that is connected to at least one client computer via a network. The on-line design server provides the customer with a process to enable the creation of a customized petal window valance that is derived from the inputs of the customer as the customer utilizes the process. During particular steps of the design process, the on-line design server provides choices for the customer wherein the customer must select at least on of the provided choices. The on-line design server includes a plurality of databases of design elements contain therein and are provided to the customer different design elements that can be selected to create the customized embodiment. The on-line design server provides a graphical representation of the designed petal valance and allows the customer to virtually construct a customized embodiment of a petal window valance. The on-line design server further facilitates the ordering of the elements so as to be shipped to the customer for final assembly or as an assembled unit.

7 Claims, 8 Drawing Sheets

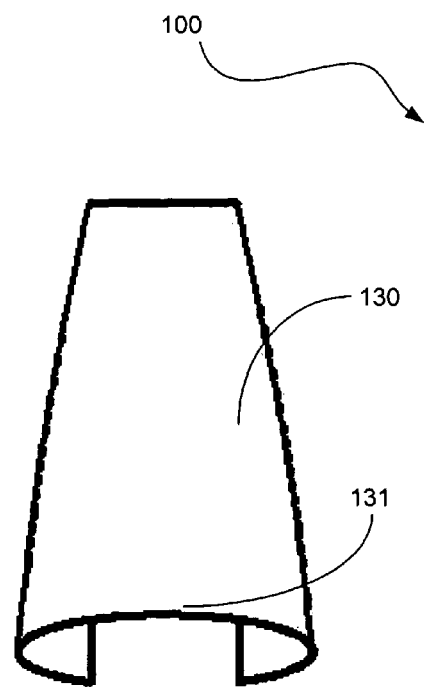
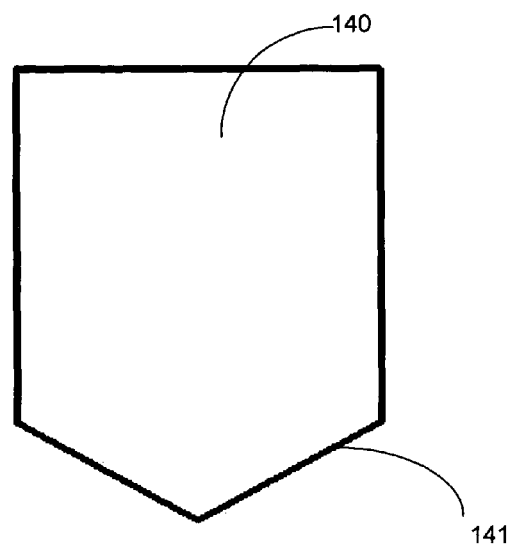
Fig. 1A
Fig. 1 B
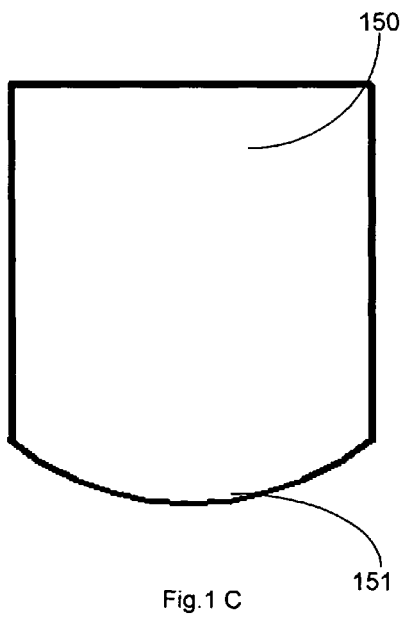
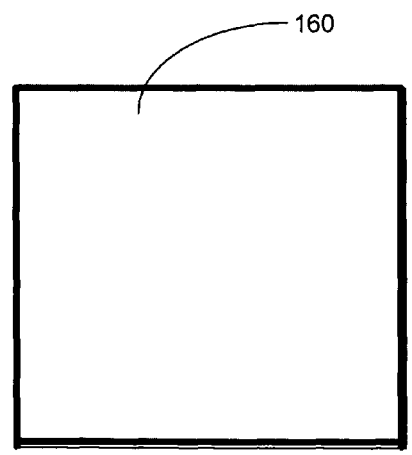
Fig. 1 C
Fig. 1 D

201

202

WINDOW PETAL VALANCE AND METHOD FOR CREATION OF CUSTOMIZED EMBODIMENTS THEREOF

CROSS REFERENCE TO RELATED APPLICATION

This nonprovisional application claims priority based upon the following prior U.S. Provisional Patent Application entitled: Method for Creation of Window Valance Embodiments, Application No. 61/160,547, filed Mar. 16, 2009, in the name of Muna Keeney, which is hereby incorporated by reference for all purposes.

FIELD OF THE INVENTION

The present invention relates to a decorative accessory, more specifically a decorative accessory manufactured from more than one petal element wherein the petal elements are provided in a design method wherein the design method facilitates the creation of a multitude of embodiments of the decorative accessory. More specifically but not by way of limitation, one type of decorative accessory that can be created is a petal window valance.

BACKGROUND

Interior design of building and residences is a multi-billion dollar a year industry in the United States. Organizations and individuals invest significant resources in developing plans and implementing design decors for the inside of their structures. Interior designers are typically employed to create a design for a room, office space or other interior section in order to enhance the appearance or create a particular disposition for a room either to enhance the decorative appeal of the space or increase the functionality. Interior designers typically select everything from the color and type of wall coating to the styles of furniture that would best facilitate the intended use for the room while satisfying the owner's preference.

One area in which interior designers usually focus on is window treatments. A plurality of different styles of window treatments exist in the marketplace today. As is known in the art, interior decorators will utilize common window treatments such as curtains, drapes or blinds to complete the decoration of a window. One particular type of window treatment is a valance. A valance is typically mounted proximate the top of a window and extends in a downward fashion such that it covers the portion of the window that interfaces with the interior wall. Valances further extend outward from the window and can have perimeter edges that are arcuate or straight in shape.

One problem with utilization of window treatments is cost. Window treatments can be very expensive, which can inhibit the ability of some organizations or individuals from completing the design of their desired interior space. Another issue with currently available window treatments, particularly window valances, is the restriction of having to purchase from what is produced and made available to purchase. Currently users seeking valances can only choose from pre-selected completed finished embodiments of a particular style and/or fabric. This significantly limits the choices of the consumer and substantially inhibits the design décor that can be implemented in the desired space.

Accordingly, there is a need to provide a method for creating a multitude of embodiments of petal window valances by providing the individual petal elements that comprise the window valance, in a plurality of colors/styles, in order to allow a user to create a customized embodiment of a petal window valance.

SUMMARY OF THE INVENTION

It is the object of the present invention to provide design elements of a decorative accessory in a plurality of styles and colors and present these options to a user in an on-line method so as to facilitate the creation of a multitude of embodiments of the decorative accessory.

Another object of the present invention is to provide design elements of a decorative accessory in a plurality of styles and colors as a step of a customized design method to assist a user in creating a customized decorative accessory such as but not limited to a petal window valance.

A further object of the present invention is to provide individual petal elements for a petal window valance that are a part of a kit that can be assembled by a user.

Still another object of the present invention is to provide a method for creating a customized petal window valance that is designed to accommodate a plurality of sizes of windows.

An additional object of the present invention is to provide a method for creating a customized petal window valance that can be implemented utilizing an on-line interface or in a store.

Another object of the present invention is to provide a petal window valance and design method that utilizes four petal shapes to create a plurality of finished embodiments of petal window valances.

Still another object of the present invention is to provide a petal window valance and design method that presents a graphical image of the design to the user during the design method.

Another object of the present invention is to provide a design method of creating a petal window valance that has as a part thereof organized categorical units such as but not limited to color, style and fabric.

A further object of the present invention is to provide a design method for creating a customized petal window valance that utilizes a relational database of the categorical units of petal choices available to the user to determine what categorical units of petals are presented to the user as a design option during the progressive steps of the design process.

An additional object of the present invention is to provide a design method of creating a petal window valance that categorizes and presents the categorical units of petals in a manner so as to facilitate the creation of a desirable petal window valance that matches the décor of the space proximate the mounting location of the window valance.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1A is a diagrammatic view of an embodiment of a petal of the present invention;

FIG. 1B is a diagrammatic view of an embodiment of a petal of the present invention;

FIG. 1C is a diagrammatic view of an embodiment of a petal of the present invention;

FIG. 1D is a diagrammatic view of an embodiment of a petal of the present invention;

TABLE

Figure 2A:
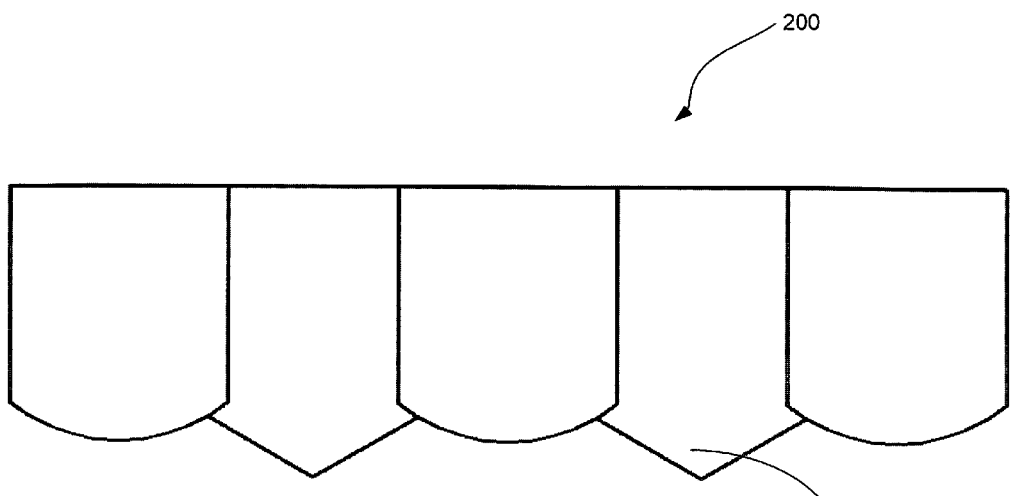
FIG. 2A is a diagrammatic view of an embodiment of a petal window valance of the present invention.
Figure 2:
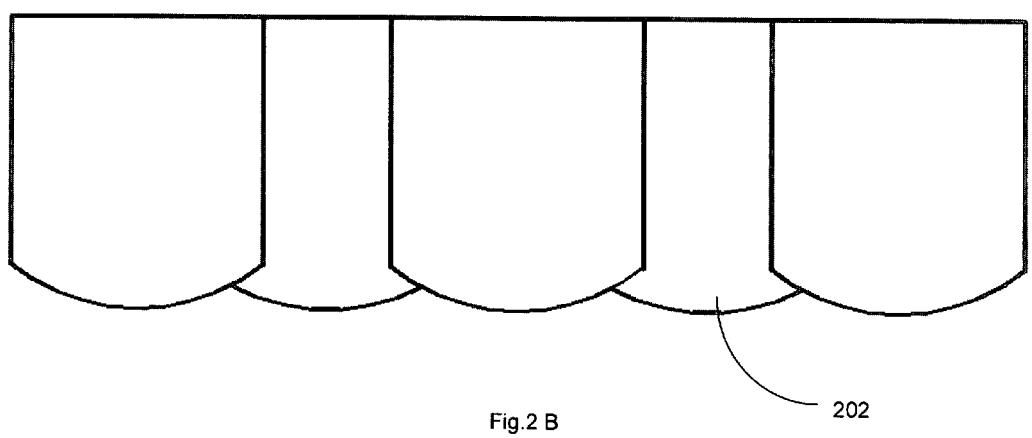
FIG. 2B is a diagrammatic view of an embodiment of a petal window valance of the present invention.
FIG. 2C is a diagrammatic view of an embodiment of a petal window valance of the present invention.
FIG. 2D is a diagrammatic view of an embodiment of a petal window valance of the present invention.
FIG. 2E is a diagrammatic view of an embodiment of a petal window valance of the present invention.
FIG. 2F is a diagrammatic view of an embodiment of a petal window valance of the present invention.
Figure 2:
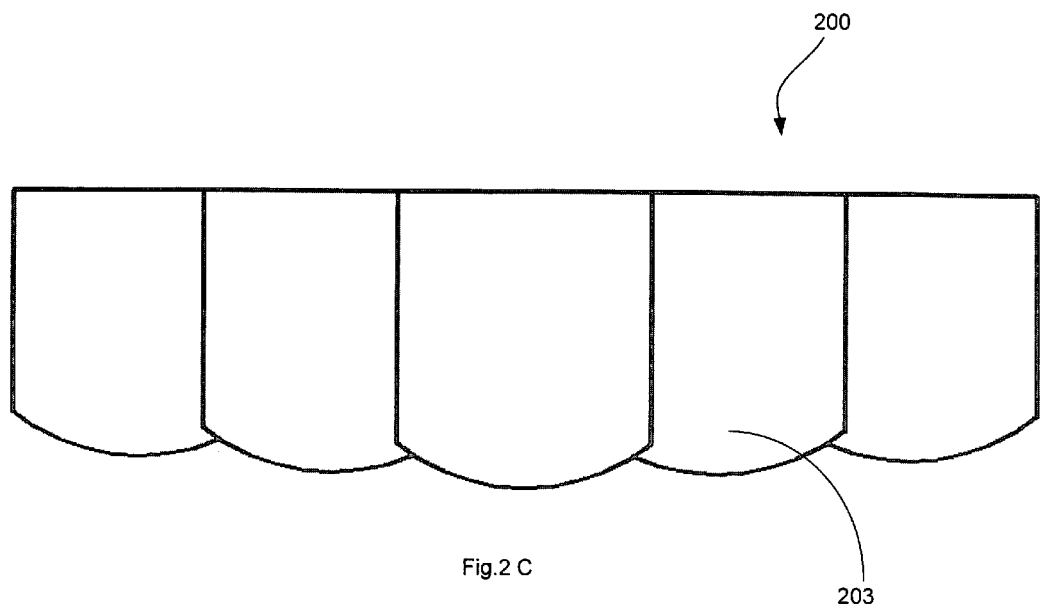
Figure 2D:
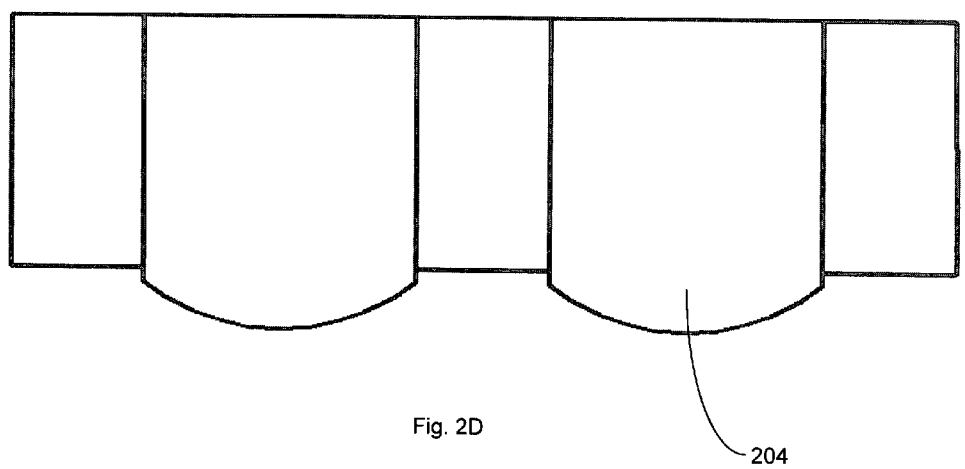
Figure 2:
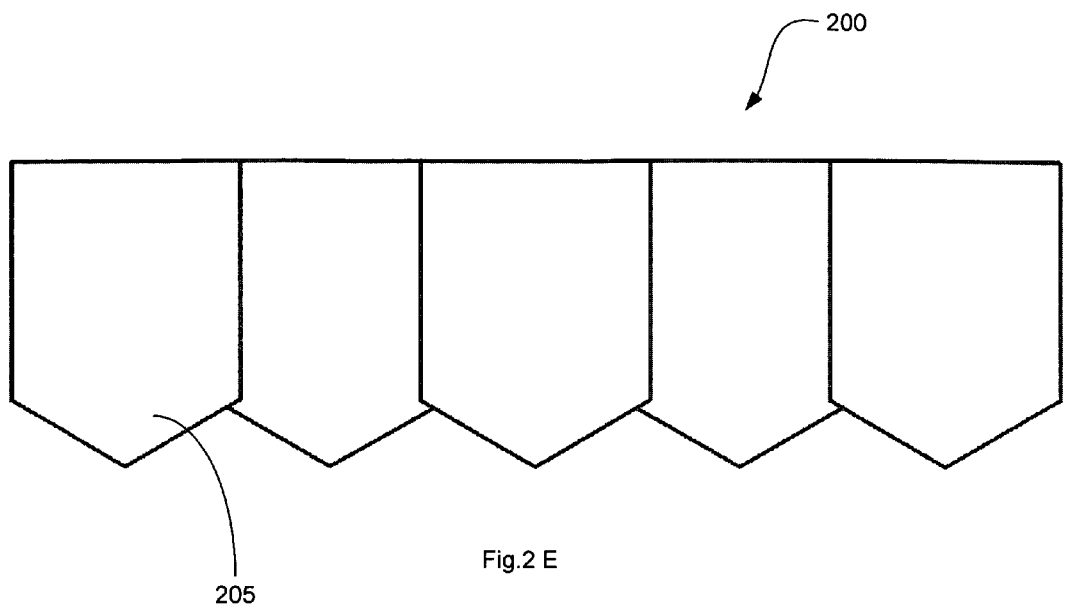
Figure 2:
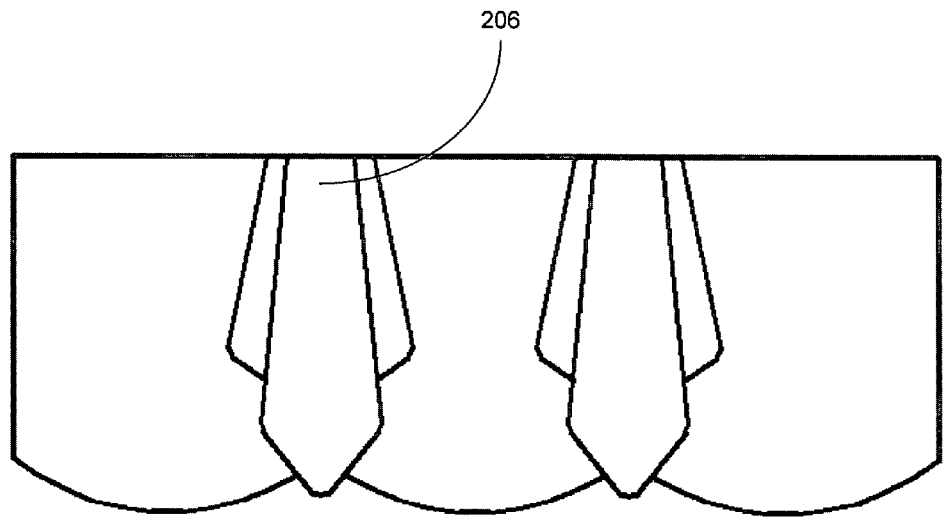

Table 1 shows examples of color families and style categories of petals that are in the petal design database and provided to the user as choices during the design method.

Table 2 shows examples of the petal quantity database wherein the valance design dictates the quantity of petals utilized to create the valance design based upon the measurement of the width of the window and a provided valance design.

DETAILED DESCRIPTION

Referring now to the drawings submitted herewith, wherein various elements depicted therein are not necessarily drawn to scale and wherein throughout the views and figures like elements are referenced with identical reference numerals, there is a method utilizing a system 300 according to the principles of the present invention.

Figure 3:
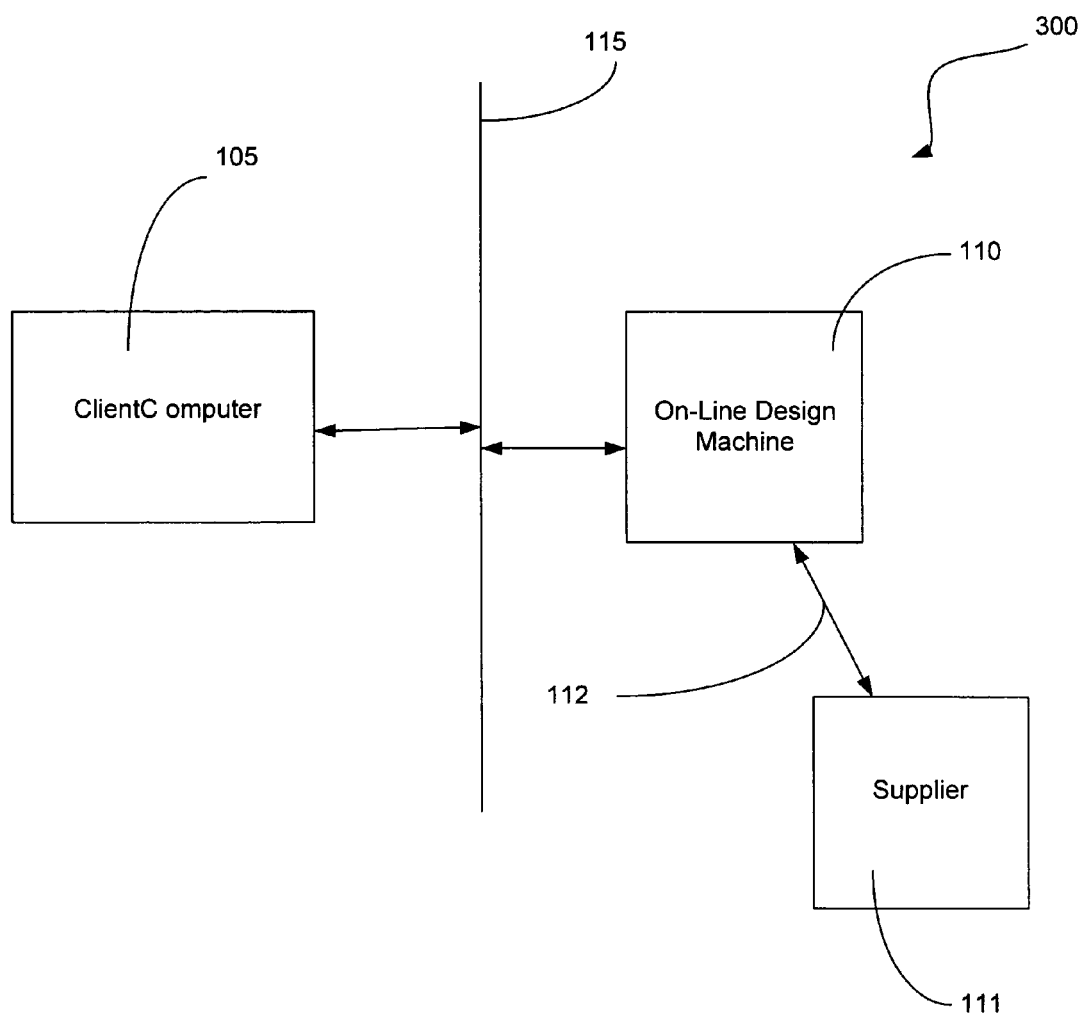
FIG. 3 is a schema of a computer network incorporating the present invention.

FIG. 3 illustrates a system 300 representing an embodiment of computer architecture of the present invention including one client computer 105 and an on-line design machine 110 in communication via a communications link 115. The on-line design machine 110 is further coupled by a link 112 to a supplier 111. In its preferred embodiment the on-line design machine 110 is a server computer. The communication link 115 as is known in the art refers to any type of wire or wireless link between computers, such as but not limited to a local area network, a wide area network, or any combinations of available communication networks. In the preferred embodiment of the present invention, the communications link 115 can be a network such as the Internet.

Figure 5:
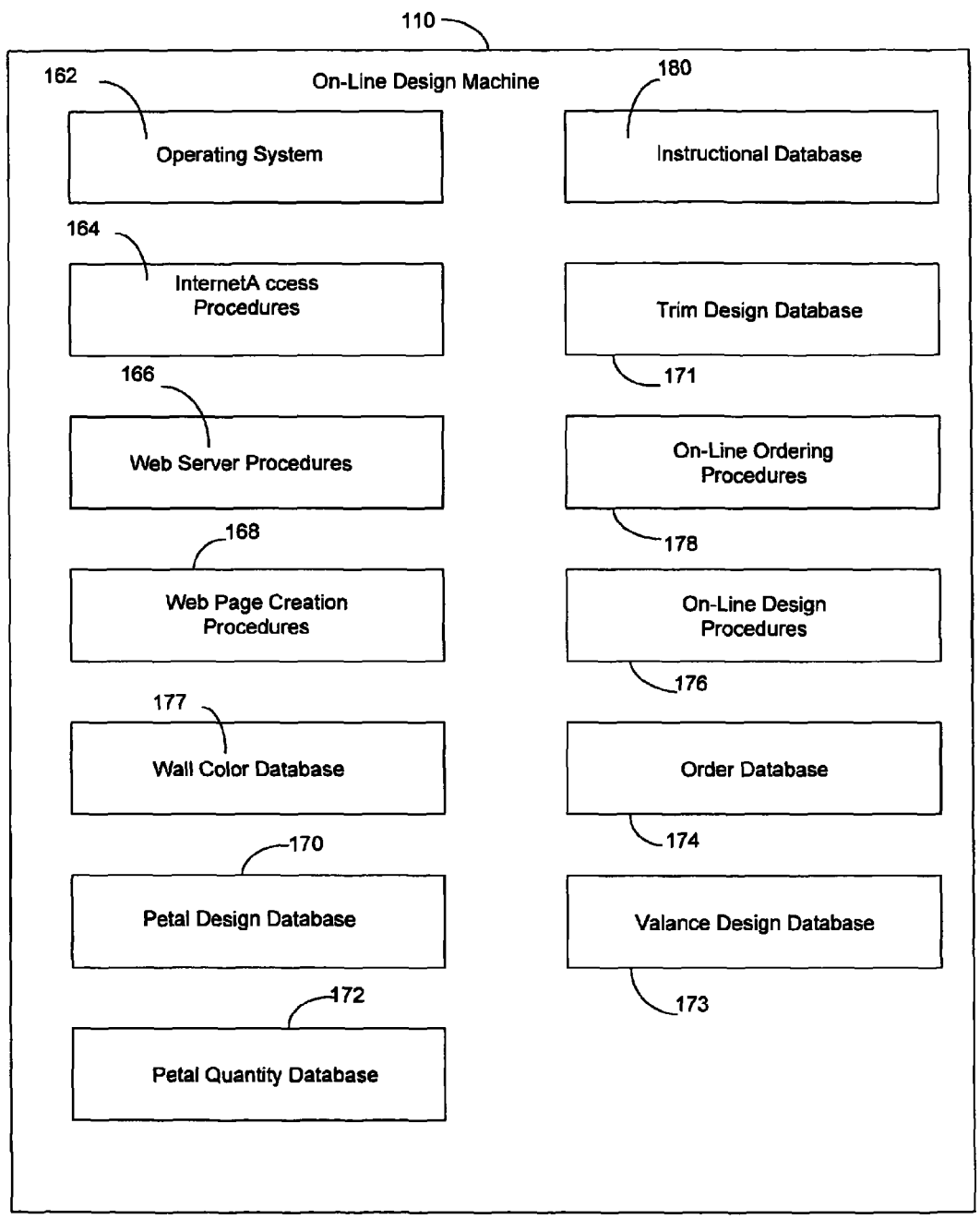
FIG. 5 is a block diagram schematic of the on-line design machine of the present invention.

The client computer 105 is any type of computing device, such as but not limited to desktop computers, workstations, laptops, mainframe computers or mobile devices configured to access the preferred communications link 115. One or more users can be associated with each client computer 105. The client computer 105 is a conventional computing device as is known in the art that includes elements such as but not limited to, a central processing unit, graphical user interface, memory and a communications interface used to communicate with the on-line design machine 110. It should be recognized by those skilled in the art that the memory of the client computer 105 could be implemented as RAM (random access memory) or as non-volatile memory such as magnetic disk storage or a combination thereof containing systems and procedures such as but not limited to, operating system and internet access procedures. The on-line design machine 110 is a conventional server computer and is configured as a conventional server computer. More specifically but not by way of limitation, the on-line design machine 110 includes a central processing unit, memory, and a communications interface configured to communicate with at least one client computer 105 utilizing the communications link 115. The on-line design machine 110 can be any type of computing device more specifically but not by way of limitation a desktop computer, workstation or mainframe computer. The on-line design machine 110 stores the software program(s) required to implement the on-line design procedure 176 utilizing the memory that is a part thereof. Those skilled in the art will recognize that the software program(s) could be stored utilizing RAM memory or non-volatile memory such as a hard drive or any combination thereof. It is contemplated within the scope of the present invention that the memory of the on-line design machine 110, of which a schema is illustrated thereof in FIG. 5, contains the following procedures and/or systems: an operating system 162; internet access procedures 164; web server procedures 166; web page creation procedures 168 that dynamically generate web pages or portions thereof in response to a customer's input; a petal design database 170 wherein the petal design database 170 includes a cataloged inventory of information on the different colors, wherein a color is defined herein as a solid color or a print having more than one color, and styles of the petals available to the customer; a petal quantity database 172, wherein the petal quantity database stores information and procedures to provide guidance as to the quantity of petals 100 to be utilized depending upon the length of the exemplary petal valance design 200 that will be created; a valance design database 173, wherein the exemplary petal valance designs 200 that can be created using a combination of the petals 100 is stored; an order database 174 wherein the order database includes information on each of the customers and their created and/or received orders; an on-line design procedure 176; an on-line ordering procedure 178; an instructional database 180 wherein the instructional database 180 includes either text and/or video instructions regarding assembly and installation instructions.

In order to execute the on-line design procedure 176 an inventory of the petals 100 shown in particular in FIGS. 1A-1D are stored in the petal database 170 and the varieties of colors thereof are provided to the customer during the on-line design procedure 176 for the customer to create a customized exemplary petal valance design 200. The petals 100 are the primary design component required to manufacture the exemplary petal valance designs 200. Six exemplary petal valance designs 201-206 are shown in particular in FIGS. 2A-2F. The petals 100 are provided in four particular shapes. Various combinations of the petals 100 are utilized to create the exemplary petal valance designs 200. As shown in FIG. 1A, a folded petal 130 is provided that is manufactured from a suitable durable material such as but not limited to fabric. The folded petal 130 has a perimeter edge 131 that is generally arcuate in shape. Those skilled in the art will recognize that the folded petal 130 could be provided to the customer in a variety of different sizes, colors and prints. Illustrated in FIG. 1B is an exemplary point bottom petal 140 that is stored in the petal database 170 and provided to the customer as an optional style petal 100 in a variety of colors, sizes and prints. The point bottom petal 140 has a lower perimeter edge 141 that is generally angular in shape. Illustrated in FIG. 1C is an exemplary round bottom petal 150 that is stored in the petal database 170 and provided to the customer as an optional style petal 100 in a variety of colors, sizes and prints. The round bottom petal 150 includes a lower perimeter edge 151 that is generally semi-annular in shape. Illustrated in FIG. 1D is an exemplary square bottom petal 160 that is constructed in accordance with the principles of the present invention. The square bottom petal 160 is stored in the petal database 170 and provided to the customer as an optional style petal 100 in a variety of colors, sizes and prints. In the present invention that the exemplary petals 100 illustrated in particular herein in FIGS. 1A-1D are utilized to form six exemplary petal valance designs 201-206 as shown in particular in FIGS. 2A-2F. While the preferred embodiment of the on-line design procedure 176 includes a valance design database 173 that includes six exemplary petal valance designs 201-206 (shown in Table 3 as being cataloged in the valance design database 173 as A, B, C, D, E, F) created from various combinations of the petals 100, it is contemplated within the scope of the present invention that the valance design database 173 could include numerous different quantities of valance designs or as few as one valance design to be presented to the customer during the on-line design procedure 176. It is further contemplated within the scope of the present invention that numerous alternative embodiments and quantities of the petals 100 could be provided within the petal design database 170 and be presented to the customer. More specifically but not by way of limitation, as few as one embodiment of a petal 100 could be provided in the petal design database 170 or more than one embodiment of a petal 100 could be provided in the petal design database 170.

The petals 100 are shipped as part of an assembly and installation kit (not illustrated herein) to the customer for final assembly to assemble and install an exemplary petal valance design 200 that was created by the customer utilizing the on-line design procedure 176. It is contemplated within the scope of the present invention that the customer can request as part of the on-line design procedure 176 that the supplier execute the final assembly of the petal valance design 200 and ship assembled. Furthermore, it is contemplated within the scope of the present invention that the assembly and installation kit further include: a support member such as but not limited, to a wood board, in sizes to include but not be limited to 1×4 or 1×5 in a length suitable to extend the width of the desired window, decorative hooks, wood pole or fiberboard; installation hardware, including but not limited to L-brackets, screws, drywall anchors and mending plates; adhesive, such as but not limited to double-sided foam tape; fasteners, such as but not limited to thumbtacks; trim material, wherein the trim material is configured to be secured to the perimeter of one or more of the petals 100 and instructions. The petals 100 are combined in what is known in the art as a layering method to create one of the six exemplary petal valance designs 201-206.

Figure 4:
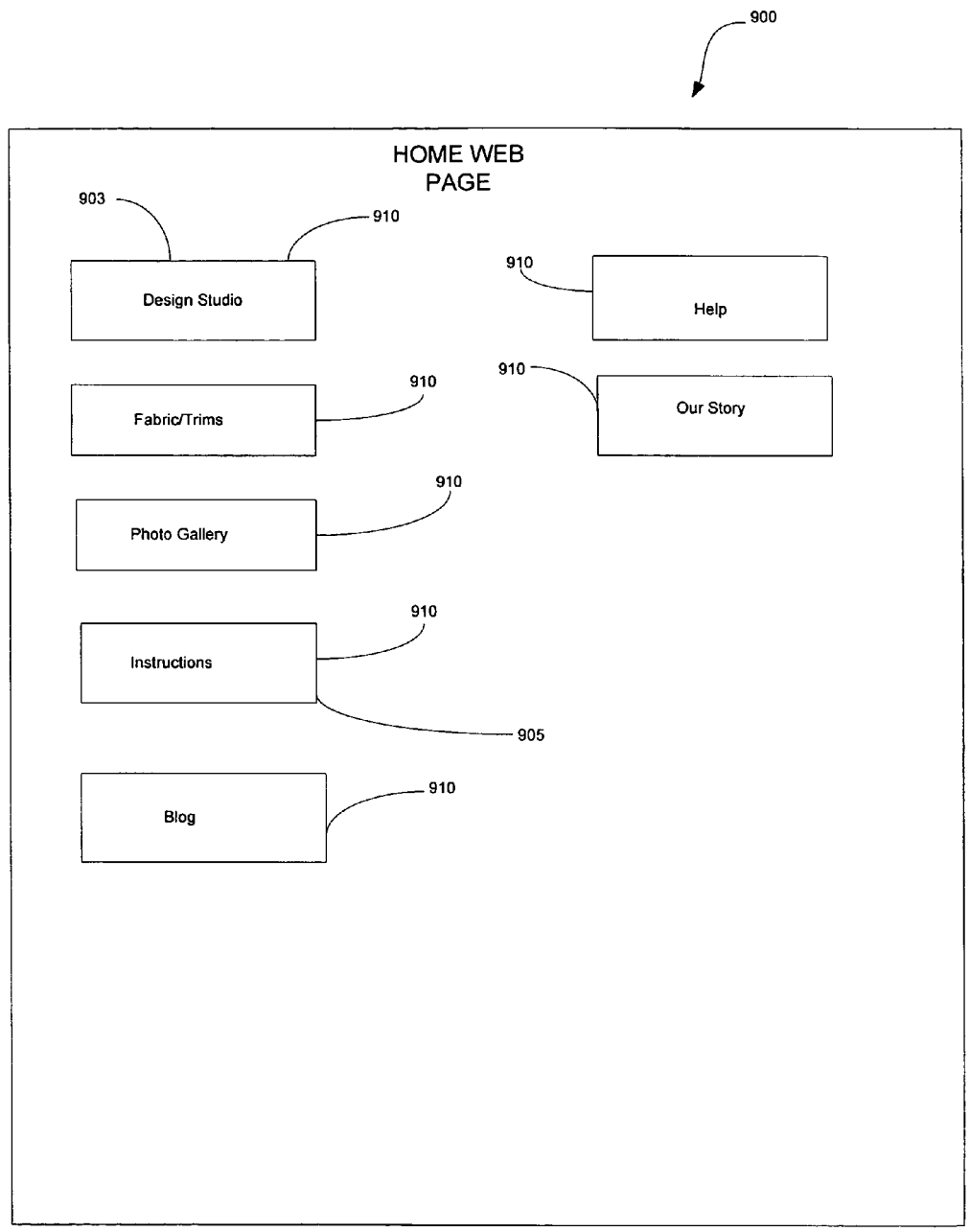
FIG. 4 is a block diagram schematic of an embodiment of the home web page interface of the present invention.
Figure 6:
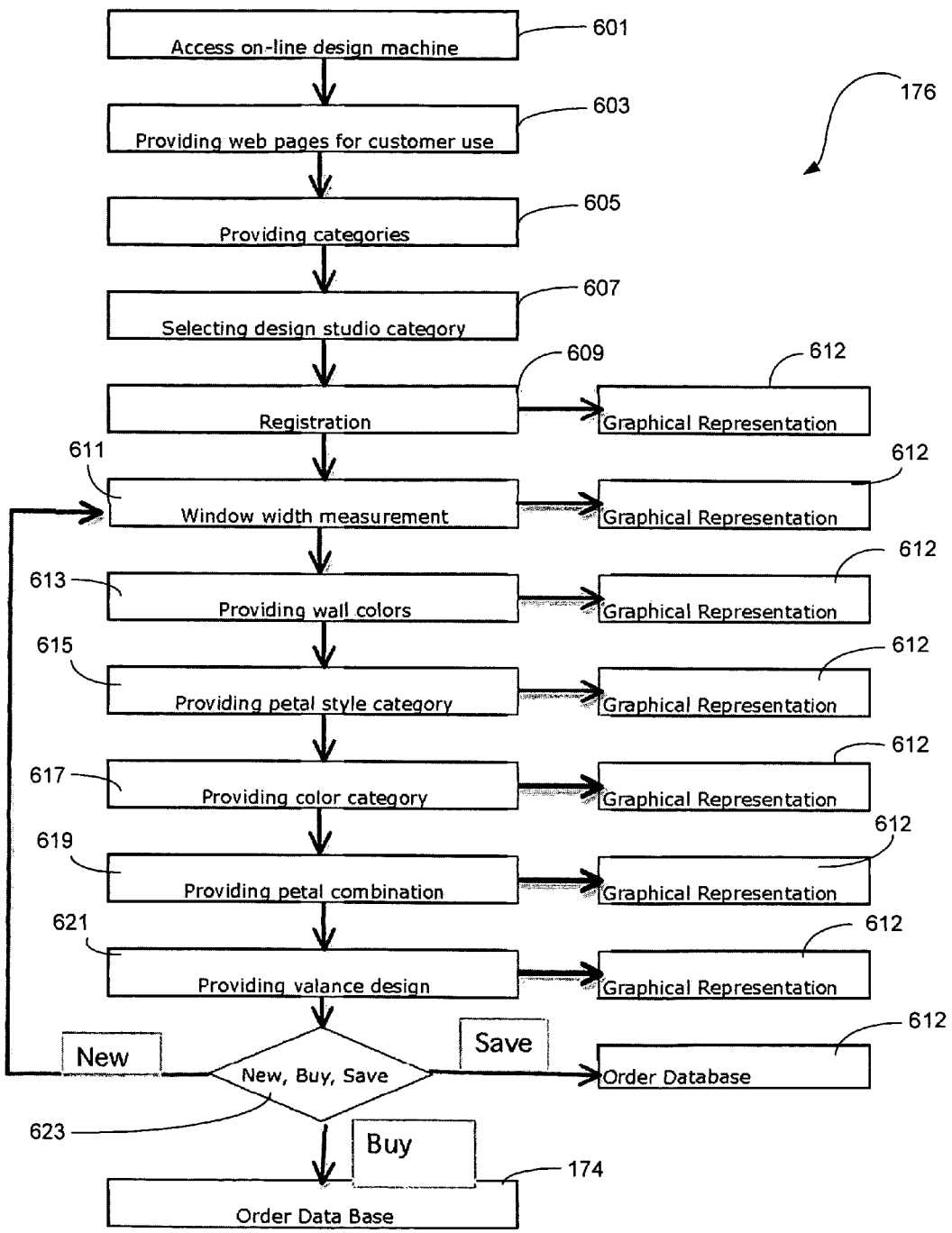
FIG. 6 is a flow chart illustrating the steps used to create an embodiment of the petal window valance of the present invention.

A discussion of the steps of the on-line design procedure 176 is as follows. FIG. 6 illustrates the steps used by the on-line design machine 110 to create an exemplary petal valance design 200. Referring in particular to FIG. 3, a customer accesses the on-line design machine 110 utilizing a client computer 105 that is connected to the Internet 115. The customer enters the appropriate universal resource locator (URL) or web address for the on-line design machine 110 (step 601). The web server procedures 166 interacts with the client computer 105 by providing access to a collection of web pages that are downloaded and/or viewed by the customer via the client computer 105 for the customers use (step 603). Initially a home web page 900, a schema of which is illustrated in FIG. 4, is provided to the client computer 105 for viewing by the customer. FIG. 4 illustrates the schema of the home web page 900 showing in particular, but not by way of limitation, the categories 910 presented in a conventional radio button/icon or icon graphical format available to the customer (step 605). Those skilled in the art will recognize that numerous different categories 910 could be present to the customer as a part of the home web page 900. One category 910 in particular provided on the home web page 900 to the customer is the design studio 903. The design studio category 903 functions as the graphical interface for the customer to access the on-line design procedure 176 to facilitate the creation of a customized exemplary petal valance design 200.

The customer selects the design studio category 903 (step 607) to access the on-line design procedure 176 and commence the procedure stored therein that will facilitate the creation of a customized exemplary petal valance design 200 without the need and/or requirement for the customer to have any prerequisite skills for matching colors, fabric and styles in order to create a desirable exemplary petal valance design 200. It should be recognized by those skilled in the art that while Step 607 utilizes an icon displaying the phrase, design studio category, that any phrase similar to the aforementioned could be utilized within an icon to identify to the customer as to where to begin the on line design procedure 176. The customer is prompted to register with the on-line design machine 110 (step 609), which is accomplished by completing requested information requested through one or more web pages. The customer is directed to a web page that prompts the user to either log-in if they are a returning customer or register if they are a new customer. During the registration (step 609), the customer is prompted as is known in the art to enter at least one of the following items of information: username, password, address, phone number, credit card information. Subsequent registration the data collected is stored in the order database 174 of the on-line design machine 110. The customer is then directed to a web page that will continue the on-line design procedure 176.

Step 611 provides the necessary graphical input fields for the customer to enter the window width measurements of the window for which they would like to create a customized exemplary petal valance design 200. Step 611 further allows the customer to create an identifier, such as a name, for their window, for example but not limited to, dining room. The identifier functions as an indicator to the customer as to which window in their residence, office or other space for which an exemplary petal valance design 200 is being created. Step 611 further includes the necessary input fields for the user to input the mounting type of the exemplary petal valance design 200. As is known in the art, valances can be mounted in at least two different manners. A first mounting method is commonly referred to as an inside mount. In this type of mounting method the valance is mounted within the window frame. A second type of commonly known mounting method is referred to as an outside mount. In the outside mount method, the valance support structure is mounted exterior and proximate to the window frame. Further included in Step 611, generated by the web page creation procedure 168, is a graphical representation 612. The graphical representation 612 illustrates a wall having a window mounted thereon is presented to the customer as a portion of the web page being viewed by the customer. The graphical representation 612 will be displayed throughout the on-line design procedure 176 functioning to provide a method previewing the selections chosen by the customer during the on-line design procedure 176. Subsequent to the customer entering the window measurements, mounting method and window name the customer is prompted by suitable methods to proceed to the next step of the on-line design procedure 176. The inputted data of Step 611 is stored in the order database 174.

Step 613 provides the user a palette of colors displayed in small graphical samples that are stored in the wall color database 177 from which the customer will choose a color that best matches the wall color of the wall having the window for which an exemplary petal valance design 200 is being created. The palette of colors provided to the customer consists of twenty-two colors including the primary colors and various shades thereof. Those skilled in the art will recognize that numerous different amounts of colors could be provided to the customer in Step 613. In step 613, the customer selects a wall color that matches, or is similar to, the wall color adjacent the window for which the customer is designing an exemplary petal valance design 200. Subsequent to selecting the desired wall color, the web page creation procedures 168 facilitate the changing of the graphical representation 612 such that the wall illustrated therein is now the color that was selected by the customer. While in one embodiment the wall color database 177 is not cross-referenced to the petal design database 170, it is contemplated within the scope of the present invention that the wall color database 177 is cross-referenced to the petal design database 170 such that only matching color categories of petals 100 are displayed to the user that match and/or are recommended with the wall color selected by the customer in development steps of the on-line design procedure 176 subsequent Step 613. The inputted data of Step 613 is stored in the order database 174.

Ensuing completion of Step 613 the user is prompted by suitable methods to advance to the next step. Step 615 provides the user four style categories of petals 100 available to the customer wherein the customer is requested to select one of the four style categories. Those skilled in the art should recognize that in Step 615 the customer could be provided a different quantity of style categories of petals 100. More specifically but not by way of limitation, the customer could be provided as few as one petal 100 or more than one petal 100 in Step 615. As shown in Table 1 submitted as a part hereof, the petals 100 are organized in the petal design database 170 by color category wherein each color category has associated therewith a style category. For example, in particular in Table 1, the color category Golds/Yellows (GY) has assigned thereto a plurality of inventory indicia such as the number 4. The inventory indicia, represents a specific color/print available for the petals 100 in the associated color category. Still referring to Table 1 each color category has associated therewith the four style categories: formal, casual, kids/teens, solid combos. Each style category has at least one color category associated therewith. It should also be recognized, as shown in Table 1, that more than one style category can be stored within the petal design database 170 for a particular color category. In step 615 the customer selects one of the four style categories provided thereto and is prompted to advance to the ensuing step. The inputted data of Step 615 is stored in the order database 174.

In step 617 the user is provided via an appropriate graphical interface the color categories that are stored within the petal design database 170. As shown in Table 1 the color categories available to the customer in step 617 are: golds/yellows, blues, greens, neutrals/earthtones, plums/pinks, aqua and reds/oranges. In Step 617 the customer is further provided the choice of, All, so that all of the color category choices stored in the petal design database 170 may be presented subsequent to Step 617. Those skilled in the art will recognize that numerous different color categories could be stored in the petal design database 170 and presented to the customer in Step 617 either in addition to and/or in conjunction with the color categories referenced herein. The customer selects one of the color categories referenced herein (step 617). In Step 617, the petal design database 170 now having received the inputted information regarding the petal style category in previous Step 615 and the inputted color category (step 617) has begun to identify which petal designs that will be displayed to the customer. The petal design database 170 as shown in Table 1 cross references the inventory indicia for the petal style category selected in Step 615 with the inventory indicia for the color category selected in Step 617 and labels these identified combinations to be displayed to the customer in subsequent development step(s) of the on-line design procedure 176. Those skilled in the art will recognize that numerous possible combinations could exist other than those shown in Table 1. It is further contemplated within the scope of the present invention that the petal design database 170 is a dynamic database wherein the color categories and the petal styles categories are consistently updated to reflect different colors and/or styles that are available to the customer. After selecting the desired color category, the customer is prompted to advance to the next step. The inputted data of Step 617 is stored in the order database 174.

Ensuing Step 617, in Step 619 the customer is presented with all of the available combinations of colors of petals 100 that are associated with the selected style category (Step 615) and corresponding selected color category (Step 617) in the petal design database 170. Table 1 provides examples of available predetermined color/style category combinations from the petal design database 170. More specifically but not by way of limitation, a customer who selected the color category GY and the style category, casual, will be presented with graphical representations of color combinations of the petals 100 shown in Table 1 as indicated by the inventory indicia such as but not limited to 61 with 3 and 61 with 63. Upon further review of Table 1, those skilled in the art will recognize that approximately thirty color combinations exist in the petal design database 170 for the selected color category, GY and style category, casual. Each inventory indicia within the color category of GY identifies a color category of a petal 100 and further includes association with a style category wherein the available combinations thereof based on the inputted selections from Step 615 and Step 617 are to be displayed to the customer in Step 619. As should be noted by those skilled in the art, Table 1 represents hundreds of possible combinations of designs of petals 100, that could be presented to the user in graphical format depending upon which color category and style category were selected in Steps 615 and 617 respectively. It is further contemplated within the scope of the present invention that the petal design database 170 could include additional color categories and/or style categories to those referenced in Table 1. Subsequent the customer selecting from the available color combinations in Step 619 the customer is prompted by suitable methods to advance to the ensuing step. The inputted data of Step 619 is stored in the order database 174.

The exemplary petal valance designs 200 available to the user based on the criteria selected in Steps 615-619 will be displayed in diagrammatic representation to the customer in Step 621. At least one of or all of the exemplary valance designs 200 as shown in particular in FIGS. 2A-2F will be displayed to the customer to select from in Step 621. Subsequent the customer selecting one of the exemplary petal valance designs 200, the web page creation procedures 168 will dynamically generate the selected exemplary petal valance design 200 in the selected color combination (step 619) proximate the top of the exemplary window of the graphical representation 612. This allows the customer to see a preview of the designed exemplary petal valance design 200 and show how it would appear against a wall color that is similar to or matching the wall color in the space where the customer desires to mount the exemplary petal valance design 200. In Step 621, the user can select from one or all of the available exemplary petal valance designs 200 to preview each exemplary petal valance design 200 to examine how each exemplary petal valance design 200 looks and decide as to which exemplary petal valance design 200 meets their desired decorative objective. It is contemplated within the scope of the present invention that the graphical representation 612 presented to the user as a part of Step 621 could be delivered to the customer in alternative methods. More specifically, but not by way of limitation the graphical representation 612 could be additionally present to the customer in an email or distributed to an additional computing device for subsequent viewing by the customer.

As shown in particular in Table 3, the exemplary petal valance designs 200 are produced utilizing an odd numbered quantity of petals. In Step 621 the valance design database 173 cross references the petal quantity database 172 and the order database 174 having stored therein the measurement of the window width inputted from Step 611, to determine the number of petals 100 that will be used to create the exemplary petal valance design 200 in Step 621. Table 3 submitted herewith for reference, shows the corresponding quantity of petals 100 required for the inputted window width from Step 611. For example, one skilled in the art will recognize upon reviewing Table 3 that a valance design having the design category of 'B' wherein the window width entered by the customer was in the range of thirty to forty inches will result in an exemplary petal valance design 200 of design category 'B' being produced utilizing three petals. Upon further review of Table 3, those skilled in the art will recognize that numerous different amounts of petals are utilized to create an exemplary petal valance design 200 depending upon the design category of valance selected (Step 621) and the window width inputted (Step 611). Those skilled in the art will recognize that numerous different design categories of valances could exist as well as numerous different window widths other than the exemplary design categories and window widths listed in Table 3. The six exemplary petal valance designs 201-206 are labeled in Table 3 as A-F and it should be recognized by those skilled in the art that the six exemplary petal valance designs 201-206 could be referenced utilizing numerous different indicia within the valance design database 173.

Further provided in Step 621 is a graphical radio button/icon that allows the customer to switch the petal color combinations displayed on the exemplary petal valance design 200 in the graphical representation 612. The graphical radio button/icon is labeled, switch petals, and can be engaged by the user to change the colors of the petals to alter the quantity of petals displayed in one of the color combinations. For example but not by way of limitation, if an exemplary petal valance design 200 was created graphically using a combination of a first and second color wherein the exemplary petal valance design 200 comprised 5 petals 100, Step 621 would display to the user three of the petals in the second color of the selected color combination and two of the petals 100 in the first color of the selected combination. By engaging the radio button/icon/icon, switch petals, the customer will then be presented with an exemplary petal valance design 200 in the graphical representation 612 wherein the first color of the selected color combination (Step 619) that was previously displayed on two of the petals 100 would now be displayed on three of the petals 100 with the other two petals 100 now displaying the second color of the selected color combination (Step 619). This provides the customer extended choices during creation of the desired customized exemplary petal valance design 200.

Additionally provided in Step 621 are trim options. As is known in the art, many fabrics can have trim applied to their perimeter edge to enhance the decorative appearance of the fabric. Provided in Step 621 are three trim options: no trim, flat trim and tassel trim. The trim options are presented in textual format having a conventional radio button/icon adjacent thereto as is known in the art, allowing the customer to select from one of the three aforementioned trim options. Subsequent the selection of at least one of the three aforementioned trim options, the diagrammatic representation of the available exemplary petal valance designs 200 being displayed to the user are altered to show the appearance of the selected trim. Those skilled in the art will recognize that numerous amounts of trim options could be presented to the customer as a portion of Step 621 as described herein. During the trim selection process the customer is presented with a conventional graphical radio button/icon labeled, browse trim. Subsequent engaging the aforementioned browse trim radio button/icon, the web page creation procedures 168 dynamically creates a separate webpage wherein the customer is presented with a pictorial and/or graphical representations of the inventory of the trim categories stored in the trim design database 171 that includes all of the trim options referenced herein.

Subsequent to Step 621 the customer is with a presented with decisions in Step 623. In step 623 the customer is presented with three options. In the first option, the customer can either choose to save the created exemplary petal valance design 200 wherein the created design will be saved to the order database 174 and be associated with that particular customer and available for subsequent viewing. In a second option, the customer can choose to create a new exemplary petal valance design 200 wherein the current exemplary petal valance design will be saved to the order database 174 and the customer will be directed to Step 611 of the on-line design procedure 176 to begin the process again. In a third option, the customer can choose to purchase the exemplary petal valance design 200 that was created utilizing the on-line design procedure 176. In the third option the customer selects the radio button/icon, buy, and the web page creation procedures 168 generate a web page showing the order details such as but not limited to: name of window, valance design category, price, quantity of petals, installation hardware, quantity. The customer can add the selected exemplary petal valance design 200 to a conventional on-line shopping cart as is known in the art and purchase utilizing conventional on-line merchant account methods.

Subsequent the exemplary petal valance design 200 being ordered by the customer, the order is received via the link 112 by the supplier 111. The supplier 111 will assemble the necessary components to construct the exemplary petal valance design 200 as purchased by the customer to include but not limited to: petals, installation hardware, assembly instructions. The supplier 111 ships the order to the customer utilizing suitable methods.

Subsequent to receipt of the fulfilled order from the supplier 111 the customer will assemble and install the exemplary petal valance design 200 that was created utilizing the on-line design procedure 176. If assistance is required to assemble the exemplary petal valance design 200 for which the customer would prefer additional assistance to the installation instructions that were shipped to the customer, the customer can utilize the client computer 105 and access the home web page 900 via the Internet 115. As previously mentioned herein, the home web page 900 has categories 910 for the customer to select. An instructions category 905 is available in a conventional radio button/icon or icon format for a customer to select. Subsequent to selecting the instruction category 905, the web page creation procedures 168 generate a additional web page that provides links to a plurality of embedded instructional videos stored in the instructional database 180. The customer will be presented with video links to play assembly and/or mounting instructions for the type of exemplary petal valance design 200 that they created utilizing the on-line design procedure 176 and purchased.

While in its preferred embodiment the on-line design procedure 176 is designed to assist a user in the creation of an embodiment of an exemplary petal valance design 200, it is further contemplated within the scope of the present invention that the on-line design procedure 176 could be utilized to provide petals 100 to create a number of different decorative accessories. More specifically but not by way of limitation, the on-line design procedure 176 could be utilized to facilitate the creation of customized decorative bedskirts, table-runners or bed canopy trim packages. As with the preferred embodiment of the on-line design procedure 176 a selection of petals 100 would be provided to the customer as part of the on-line design procedure 176 and the graphical representation 612 would represent the particular decorative accessory that was to be created by the customer.

While not illustrated in the drawings submitted herewith, it is contemplated within the scope of the present invention that each step of the on-line design procedure 176 would further include a help icon to assist the user with any questions concerning that particular step. For example but not by way of limitation, a help icon could be provided for Step 611 wherein the user is provided information regarding the different types of mounting styles in which a petal valance design 200 can be mounted. Those skilled in the art should recognize that the web page creation procedures 168 could be utilized to assist in this process and generate a separate web page that contains the information about a particular step and the data that is be requested to be input.

While in its preferred embodiment, an exemplary petal valance design 200 is created by a user accessing the on-line design procedure 176, it is further contemplated that the on-line design procedure 176 could be locally stored on a computing device such as but not limited to a laptop wherein the user could access and engage in the on-line design procedure 176 on the local computing device. Additionally, it is contemplated within the scope of the present invention that a representative such as but not limited to a sales representative could utilize the on-line design procedure 176 that is stored on a laptop to facilitate in the assistance of the creation of an exemplary petal valance design 200 with a customer in a one to one interaction. In this embodiment, the sales representative would utilize a laptop containing the software program that includes as a part thereof the on line design procedure 176 stored locally on the laptop. Utilizing the steps discussed herein to facilitate the creation of an exemplary petal valance design 200.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

TABLE 1

PETAL DESIGNS

| Color Category | | | | | | | | | | |
| --- | --- | --- | --- | --- | --- | --- | --- | --- | --- | --- |
| Gold/Yellows - (GY) | 61 | 3 | 4 | 49 | 32 | 33 | 62 | 17 | 18 | 22 |
| Style Category - Formal | 49, 33 | 21, 33 | 42, 33 | 43, 33 | 44, 33 | 49, 32 | 33, 38 | 33, 37 | 32, 38 | 32, 34 |
| Style Category - Casual | 3, 63 | 61, 76 | 17, 62 | 18, 62 | 4, 77 | 4, 78 | 4, 73 | 61, 49 | | |
| Style Category - Kids | 27, 62 | | | | | | | | | |
| Style Category - Solid Combos | 62, 63 | 62, 65 | 62, 64 | 62, 79 | 62, 78 | 62, 77 | 62, 76 | 62, 75 | 62, 74 | 62, 68 |
| Neutrals and Earthtones - NE) | 7 | 64 | 63 | 60 | 66 | 67 | 80 | 32 | 37 | 65 |
| Style Category - Formal | 44, 33 | 44, 32 | 44, 35 | 44, 46 | 21, 32 | 21, 33 | 21, 35 | 22, 37 | 22, 32 | 37, 36 |
| Style Category - Casual | 7, 1 | 7, 5 | 7, 80 | | | | | | | |
| Style Category - Kids | | | | | | | | | | |
| Style Category - Solid Combos | 60, 63 | 60, 74 | 60, 75 | 60, 76 | 60, 77 | 60, 78 | 60, 79 | 60, 68 | 60, 69 | 60, 70 |
| | 60, 71, 66 | 60, 71, 64 | 60, 63, 70 | 60, 62, 63 | 63, 62 | 63, 69 | 63, 70 | 63, 71 | 63, 72 | 63, 75 |
| | 65, 75 | 65, 76 | 65, 62 | 65, 70 | 65, 69 | 65, 71 | 65, 72 | 65, 75, 62 | 65, 76, 61 | 65, 76, 80 |
| | 66, 77 | 66, 77, 62 | 66, 71, 63 | 66, 73, 76 | 67, 73 | 67, 77 | 67, 78 | 67, 63, 76 | 67, 77, 68 | 67, 71, 63 |
| Aqua - (A) | 1 | 71 | 26 | | | | | | | |
| Style Category - Formal | 1 | 1, 34 | 1, 36 | | | | | | | |
| Style Category - Casual | 1, 70 | 1, 60 | 1, 80 | 1, 64 | 1, 66 | | | | | |

TABLE 1-continued

PETAL DESIGNS

| | | | | | | | | | |
|---|---|---|---|---|---|---|---|---|---|
| Style Category - Kids | 26, 63 | | | | | | | | |
| Style Category - Solid Combos | 71, 63 | 71, 60 | 71, 62 | 71, 61 | 71, 79 | 71, 65 | 71, 66 | 71, 67 | 71, 82 |
| Blues - (B) Style Category - Formal | 15 | 18 | 19 | 82 | 72 | 73 | 25 | 30 | 27 |
| Style Category - Casual | 15, 82 | 15, 60 | 15, 63 | 15, 74 | 18, 73 | 18, 72 | 18, 82 | 18, 62 | 18, 68 | 18, 36 |
| Style Category - Kids | 27, 82 | 25, 82 | 31, 82 | 30, 75 | 30, 76 | 30, 78 | 25, 72 | 25, 65 | 25, 70 | 25, 63 |
| Style Category - Solid Combos | 82, 79 72, 65 | 82, 78 72, 66 | 82, 77 | 82, 76 | 82, 75 | 82, 69 | 82, 70 | 82, 72 | 82, 66 | 82, 67 |
| Plums and Pinks - (PP) | 15 | 31 | 49 | 28 | 43 | | | | | |
| Style Category - Formal | 49, 36 | 49, 35 | 49, 33 | 49, 32 | | | | | | |
| Style Category - Casual | 49, 61 | 49, 68 | 43, 32 | 43, 33 | | | | | | |
| Style Category - Kids | 31, 82 | 31, 74 | 31, 75 | 31, 70 | 28, 82 | 28, 79 | 28, 74 | 28, 75 | | |
| Style Category - Solid Combos | 79, 82 | 79, 60 | 79, 80 | 79, 65 | 79, 62 | 74, 62 | 74, 63 | 74, 60 | 74, 80 | 74, 70 |
| Greens - (G) | 3 | 5 | 11 | 16 | 47 | 49 | 25 | 28 | 31 | 68 |
| Style Category - Formal | 3, 38 | 3, 36 | 11, 36 | 47, 35 | 47, 36 | 47, 38 | 49, 36 | 49, 36 | 49, 33 | |
| Style Category - Casual | 3, 68 | 3, 77 | 3, 78 | 5, 64 | 5, 66 | 5, 60 | 5, 67, 60 | 5, 67, 64 | 5, 82 | 11, 80 |
| Style Category - Casual | 47, 68 | 47, 77 | 47, 78 | 47, 64 | 47, 64, 77 | 47, 77, 68 | 49, 68 | 20, 68 | 20, 70 | 20, 76, 70 |
| Style Category - Casual | 20, 68, 75 | 20, 82 | 20, 75, 82 | 20, 82, 69 | 20, 68, 70 | 20, 76, 70 | | | | |
| Style Category- Kids | 25, 70 | 28, 70 | 31, 70 | | | | | | | |
| Solid combos | 69, 82 | 70, 82 | 69, 64 | 70, 64 | 69, 65 | 70, 65 | 68, 66 | 68, 65 | 68, 62 | 68, 60 |
| Reds and Oranges - (RO) | 3 | 14 | 17 | 20 | 47 | 76 | 77 | 78 | 38 | 21 |
| Style Category - Formal | 38, 22 | 38, 47 | 38, 3 | 38, 4 | 42, 32 | 42, 33 | 22, 38 | 38, 36 | 38, 34 | 38, 33 |
| Style Category - Casual | 3, 68 | 3, 77 | 3, 78 | 3, 61 | 14, 82 | 14, 77 | 14, 78 | 14, 77, 82 | 14, 77, 78 | 14, 62, 82 |
| Style Category - Casual | 17, 62, 63 | 17, 62, 82 | 17, 68, 62 | 17, 62, 63 | 20, 68 | 20, 70 | 20, 74 | 20, 78 | 20, 75 | 20, 76, 70 |
| Style Category - Casual | 47, 68 | 47, 77 | 47, 78 | 47, 77, 68 | 47, 68, 78 | 47, 61, 68 | 47, 68, 66 | 47, 68, 64 | 20, 76, 70 | 20, 75, 70 |
| Style Category - Kids | | | | | | | | | | |
| Style Category - Solid Combos | 78, 63 | 78, 62 | 78, 61 | 78, 71 | 78, 60 | 78, 80 | 78, 68 | 78, 69 | 78, 70 | 78, 73 |
| Style Category - Solid Combos | 77, 69 | 77, 71 | 76, 80 | 76, 60 | 76, 61 | 76, 62 | 76, 63 | 76, 69 | 76, 71 | 76, 73 |
| Style Category - Solid Combos | 75, 73 | 82, 75 | 82, 76 | 82, 77 | 82, 78 | | | | | |

Color Category

| | | | | | | | | | |
|---|---|---|---|---|---|---|---|---|---|
| Gold/Yellows - (GY) | | | | | | | | | |
| Style Category - Formal | 4, 38 | 4, 63 | 4, 82 | 22, 37 | 22, 38 | 22, 32 | | | |
| Style Category - Casual | | | | | | | | | |
| Style Category - Kids | | | | | | | | | |
| Style Category - Solid Combos | 62, 71 | 62, 72 | 62, 73 | 62, 82 | 61, 77 | 61, 78 | 61, 65 | 61, 64 | 61, 68 |
| Neutrals and Earthtones - NE) | 61 | 21 | 22 | 44 | | | | | |
| Style Category - Formal | 37, 35 | 37, 34 | 37, 33 | 32, 34 | 32, 38 | | | | |
| Style Category - Casual | | | | | | | | | |
| Style Category - Kids | | | | | | | | | |
| Style Category - Solid Combos | 60, 71 63, 76 65, 71, 62 | 60, 72 63, 77 65, 71, 60 | 60, 73 63, 78 65, 71, 76 | 60, 64 63, 79 65, 71, 79 | 60, 65 63, 75, 76 66, 71 | 60, 75, 72 63, 70, 79 66, 72 | 60, 72, 65 64, 75 66, 73 | 60, 82, 65 64, 62 66, 75 | 60, 70, 65 64, 61 66, 76 |
| Aqua - (A) | | | | | | | | | |
| Style Category - Formal | | | | | | | | | |
| Style Category - Casual | | | | | | | | | |
| Style Category - Kids | | | | | | | | | |
| Style Category - Solid Combos | | | | | | | | | |
| Blues - (B) | | | | | | | | | |
| Style Category - Formal | | | | | | | | | |
| Style Category - Casual | 19, 60 | 19, 62 | 19, 80 | 19, 34 | | | | | |

TABLE 1-continued

PETAL DESIGNS

| | | | | | | | | |
|---|---|---|---|---|---|---|---|---|
| Style Category - Kids | 27, 68 | 27, 75 | 27, 65 | 27, 76 | 27, 78 | 27, 77 | | |
| Style Category - Solid Combos | 73, 72 | 73, 64 | 73, 66 | 73, 67 | 73, 75 | 73, 76 | 73, 78 | 73, 79 |
| Plums and Pinks - (PP) | | | | | | | | |
| Style Category - Formal | | | | | | | | |
| Style Category - Casual | | | | | | | | |
| Style Category - Kids | | | | | | | | |
| Style Category - Solid Combos | 74, 62 | | | | | | | |
| Greens - (G) | 69 | 70 | 36 | 35 | 20 | | | |
| Style Category - Formal | | | | | | | | |
| Style Category - Casual | 11, 68 | 16, 82 | 16, 68 | 16, 69, 80 | 16, 63 | 16, 65 | 16, 65, 80 | |
| Style Category - Casual | 20, 74, 70 | 20, 75, 70 | 20, 70, 63 | 20, 63, 75 | | | | |
| Style Category - Casual | | | | | | | | |
| Style Category - Kids | | | | | | | | |
| Solid combos | 68, 80 | | | | | | | |
| Reds and Oranges - (RO) | 22 | 42 | 75 | | | | | |
| Style Category - Formal | | | | | | | | |
| Style Category - Casual | 14, 63 | 14, 62, 63 | 14, 65 | 14, 73 | 17, 68 | 17, 77 | 17, 78 | 17, 77, 68 | 17, 77, 69 |
| Style Category - Casual | 20, 74, 70 | 20, 75, 70 | 20, 70, 63 | 20, 63, 75 | 20, 68, 75 | 20, 82 | 20, 75, 82 | 20, 82, 78 |
| Style Category - Casual | | | | | | | | |
| Style Category - Kids | | | | | | | | |
| Style Category - Solid Combos | 78, 64 | 78, 66 | 78, 67 | 77, 62 | 77, 61 | 77, 60 | 77, 80 | 77, 66 | 77, 67 |
| Style Category - Solid Combos | 75, 64 | 75, 65 | 75, 67 | 75, 60 | 75, 62 | 75, 63 | 75, 70 | 75, 71 | 75, 72 |
| Style Category - Solid Combos | | | | | | | | |

TABLE 2

| | Valance Designs | | | | | |
|---|---|---|---|---|---|---|
| | A | B | C | D | E | F |
| Width of Window | Quantity of Petals | | | | | |
| 25-33" | | | | | | 3 |
| 25-30 | 3 | 3 | 3 | 3 | 3 | 3 |
| 30-40 | 3 | 3 | 3 | 3 | 3 | |
| 34-55 | | | | | | 5 |
| 41-48 | 5 | 5 | 5 | 5 | 5 | |
| 49-66 | 5 | 5 | 5 | 5 | 5 | |
| 55-75 | | | | | | 7 |
| 68-88 | 7 | 7 | 7 | 7 | 7 | |
| 76-95 | | | | | | 9 |
| 89-96 | 9 | 9 | 9 | 9 | 9 | |
| 97-115 | 9 | 9 | 9 | 9 | 9 | |
| 96-118 | | | | | | 11 |
| 116-135 | 11 | 11 | 11 | 11 | 11 | |
| 135-160 | 11 | 11 | 11 | 11 | 11 | |
| 119-140 | | | | | | 13 |
| 141-160 | | | | | | 15 |

What is claimed is:

1. A method for facilitating the design and ordering of a customized window petal valance, wherein the customized window petal valance is designed and ordered by a consumer from a computer connected to the Internet comprising the steps of:
    providing a web site, said web site providing a graphical interface for a user to implement the method;
    providing an on-line design studio, said on-line design studio being provided as a category icon on the web site; said on-line design studio operable to facilitate an on-line design and ordering procedure for at least one customized window petal valance;
    selecting the on-line design studio;
    entering window measurements;
    generating a graphical representation, said graphical representation being presented to display an image illustrating an exemplary wall having an exemplary window therein;
    providing a wall color database, said wall color database being graphically presented to a user, said wall color database providing a plurality of colors;
    selecting a wall color from said wall color database;
    updating the graphical representation, said graphical representation being updated with the selected wall color, wherein the exemplary wall of the graphical representation displays the selected wall color selected;
    providing four petal category styles;
    selecting one petal category style from said four petal category styles;
    providing a petal color category database;
    selecting a color from said petal color category database;
    displaying a plurality of petal color combinations associated with the petal category style selected in said selecting one petal category style from said four petal category styles;
    selecting a petal color combination, said petal color combination consisting of a first color and a second color;
    updating the graphical representation, said graphical representation being updated with the petal style category and petal color combination selected, wherein the graphical representation presents an exemplary window petal valance utilizing an odd number quantity of petals and wherein the first color is displayed on a discrete number of petals of the exemplary window petal valance and the second color is displayed on the remaining number of petals of the exemplary window petal valance; and
    ordering the exemplary window petal valance.

2. The method as recited in claim 1, and further comprising the step of selecting a trim design, wherein the selected trim design is included with the exemplary window petal valance.

3. The method as recited in claim 2, and further comprising the step of switching the color combination displayed on the exemplary window petal valance, wherein the first color and second color are switched to display the exemplary window petal valance utilizing an alternative color combination.

4. The method as recited in claim 3, and further comprising the step of providing an instructional database, said instructional database containing multimedia instructions for installing an ordered exemplary window petal valance.

5. The method as recited in claim 4, wherein said wall color database includes twenty-two colors including primary colors.

6. The method as recited in claim 5, wherein said wall color database and said petal color category database are cross-referenced so as to provide a user with a limited number of petal color options based upon an inputted wall color.

7. The method as recited in claim 6, wherein said four category petal styles include: formal, casual, kids/teens and solid combinations.

* * * * *